US012420569B2

(12) United States Patent
Taki

(10) Patent No.: US 12,420,569 B2
(45) Date of Patent: Sep. 23, 2025

(54) PRINTER

(71) Applicant: TOSHIBA TEC KABUSHIKI KAISHA, Tokyo (JP)

(72) Inventor: Hiroyuki Taki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 214 days.

(21) Appl. No.: 18/090,976

(22) Filed: Dec. 29, 2022

(65) Prior Publication Data

US 2024/0217247 A1 Jul. 4, 2024

(51) Int. Cl.

*B41J 11/04* (2006.01)
*B41J 3/407* (2006.01)
*B41J 11/00* (2006.01)
*B41J 25/308* (2006.01)
*B41J 29/38* (2006.01)
*B41J 32/02* (2006.01)
*B41J 35/04* (2006.01)

(52) U.S. Cl.

CPC .............. *B41J 11/04* (2013.01); *B41J 11/007* (2013.01); *B41J 25/308* (2013.01); *B41J 29/38* (2013.01); *B41J 32/02* (2013.01); *B41J 35/04* (2013.01); *B41J 3/4075* (2013.01); *B41J 2203/01* (2020.08)

(58) Field of Classification Search

CPC ........ B41J 11/42; B41J 3/4075; B41J 11/007; B41J 35/04; B41J 11/04; B41J 25/308; B41J 29/38; B41J 32/02

USPC ................ 347/5, 8, 16, 19, 37, 84, 101, 104

See application file for complete search history.

(56) References Cited

U.S. PATENT DOCUMENTS 10,000,070 B1 6/2018 Katsumata
2015/0009257 A1* 1/2015 Endo ........................ B41J 11/46 347/16
2017/0182812 A1 6/2017 Sasaki et al.
2018/0201037 A1 7/2018 Sasaki et al.
2021/0206176 A1* 7/2021 Matsuda ................ B41J 3/4075

FOREIGN PATENT DOCUMENTS

JP 2007-210276 A 8/2007

* cited by examiner

*Primary Examiner* — Jannelle M Lebron

(74) *Attorney, Agent, or Firm* — FOLEY & LARDNER LLP

(57) ABSTRACT

A printer includes a conveyor, a print head, a platen roller, an actuator, and a controller. The platen roller applies a conveying force by rotating while pinching a medium between the platen roller and the print head. The controller is configured to: enable a saving mode in which the print head is moved to a first position when a first area of the medium passes, and the print head is moved to a second position when a second area of the medium passes; detect a difference between a first conveyance amount of the medium when the actuator is in the saving mode, and a second conveyance amount of the medium when the print head is in the first position; and adjust a setting corresponding to the first conveyance amount so as to eliminate the difference.

10 Claims, 4 Drawing Sheets

PRINTER

FIELD

Embodiments described herein relate generally to a printer that prints a barcode or the like on a label.

BACKGROUND

A printer of a ribbon transfer system has a function (ribbon saving) of stopping conveyance of an ink ribbon when a non-printed area of a medium to be printed passes through a thermal head. When performing ribbon saving, the printer stops the ink ribbon and separates the thermal head from a platen roller at the same time. For this reason, there is a possibility that a conveying force applied from the platen roller to the medium to be printed becomes weak at the time of operation in the ribbon saving, a conveyance delay occurs in the medium to be printed (e.g., printed upon), and a printing position is shifted.

DETAILED DESCRIPTION

A printer according to one embodiment includes a conveyor, a print head, a platen roller, an actuator, and a controller. The conveyor conveys a medium to be printed through a conveyance path. The print head performs printing in a printed area of the medium to be printed when the medium is conveyed through the conveyance path. The platen roller is disposed on a side opposite to the print head with the conveyance path interposed therebetween, and applies a conveying force to the medium by rotating in a conveyance direction while pinching the medium between the platen roller and the print head. The actuator moves one of the print head and the platen roller between a first position where the print head and the platen roller pinch the medium and a second position where the print head is spaced from the medium. The controller is operatively coupled to the actuator and is configured to enable a saving mode and operate the actuator in the saving mode in which the one of the print head and the platen roller is moved to the first position when the first area of the medium passes through the print head, and the one of the print head and the platen roller is moved to the second position when a second area of the medium passes through the print head. The controller is configured to detect a difference between a first conveyance amount for the medium to pass through the print head when the medium is conveyed by the conveyor and the actuator is operated in the saving mode, and a second conveyance amount for the medium to pass through the print head when the medium is conveyed by the conveyor and the platen roller is in a state where the one of the print head and the platen roller is moved to the first position. The controller is configured to adjust, based the difference, a setting corresponding to the first conveyance amount of the medium so as to eliminate the difference between the first conveyance amount and the second conveyance amount.

Hereinafter, a printer 100 according to an embodiment will be described with reference to the drawings. In the following drawings used for the description of the embodiment, a scale of each part may be appropriately changed. In addition, in the following drawings used for the description of the embodiment, a configuration may be omitted in order to make the description easy to understand.

Figure 1:
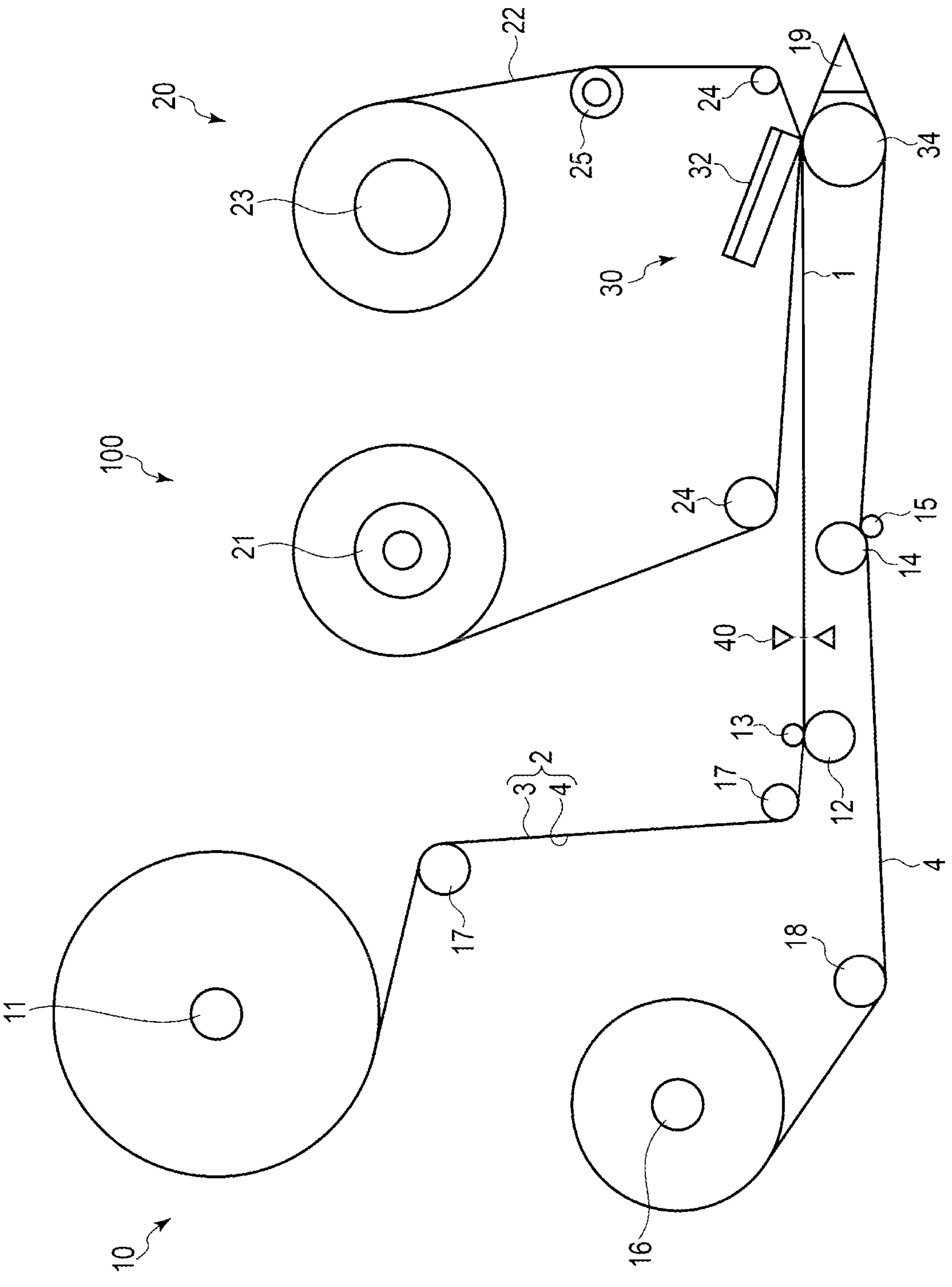
FIG. 1 is a schematic diagram illustrating a printer.

As illustrated in FIG. 1, the printer 100 includes a label conveying part 10, a ribbon conveying part 20, and a printing unit 30. The label conveying part 10 conveys a label paper 2 through a conveyance path 1. The ribbon conveying part 20 conveys an ink ribbon 22 so as to overlap the label paper 2. The printing unit 30 performs printing on a label 3 of the label paper 2 via the ink ribbon 22. The printer 100 includes a frame (or a housing) (not illustrated) to which the components of the label conveying part 10, the ribbon conveying part 20, and the printing unit 30 are attached in a predetermined positional relationship.

The label paper 2 is obtained by attaching a plurality of rectangular labels 3 to one surface of a long belt-like backing paper 4 with a gap of about 1 mm to 3 mm therebetween (e.g., a gap between respective rectangular labels 3 along the length of the backing paper 4) at equal intervals. The label paper 2 is an example of a belt-like medium (e.g., medium to be printed, etc.) described in the present application. The label 3 has a fixed length along a longitudinal direction of the backing paper 4. The label 3 has an adhesive layer on an adhesion surface between the label 3 and the backing paper 4 in order to be detachable from the backing paper 4 and to be attachable to another article. The label 3 is an example of a medium to be printed described in the claims of the present application.

The label 3 has a printed area and a non-printed area along a conveyance direction of the label paper 2. An image, a character, and the like may be printed in the printed area. No image, character, or the like is printed in the non-printed area. For example, when a two-dimensional barcode is printed (or to be printed) on the label 3, a rectangular area having the same length as the two-dimensional barcode along the conveyance direction (i.e., the printed length of the barcode) is one printed area (e.g., the product of the length and a width of the label is the printed area). For example, when a character is printed in addition to the two-dimensional barcode, a rectangular area of the label 3 having a predetermined length along the conveyance direction on which the character is printed is one printed area. An area having a predetermined length and having nothing printed therein, between the printed area in which the two-dimensional barcode is printed and the printed area in which the character is printed along the conveyance direction, is one non-printed area, for example. As a matter of course, the gap between two adjacent labels 3 is also one non-printed area. The printed area and the non-printed area of the label 3 are determined based on data to be printed on the label 3, and are present alternately along the conveyance direction, and dimensions and layout thereof are also different depending on print data. Each label 3 may have one or more printed area and/or one or more non-printed area.

The label conveying part 10 includes a delivery roller 11 around which the label paper 2 is wound into rolls, and a winding roller 16 that winds the backing paper 4 into rolls from which the label 3 is peeled off. The label conveying part 10 includes a capstan roller 12 on a lower side of the conveyance path 1 between the delivery roller 11 and the printing unit 30 as illustrated, that is, on a back surface side of the backing paper 4 of the label paper 2 conveyed through the conveyance path 1. A pinch roller 13 (e.g., biased roller, clamping roller, etc.) is provided at a position where the pinch roller 13 faces the capstan roller 12 with the conveyance path 1 interposed therebetween, that is, on a label 3 side. The pinch roller 13 is pressed against the capstan roller 12 by a biasing member such as a spring or the like, with the label paper 2 sandwiched therebetween. The capstan roller 12 rotates in a clockwise direction in FIG. 1 to pull out the label paper 2 sandwiched between the capstan roller 12 and the pinch roller 13 from the delivery roller 11.

The label conveying part 10 includes a peeling roller 14 between the printing unit 30 and the winding roller 16. The peeling roller 14 conveys the backing paper 4 from which the label 3 is peeled off. A pinch roller 15 is provided at a position where the pinch roller 15 faces the peeling roller 14 with the backing paper 4 sandwiched therebetween. The pinch roller 15 is pressed against the peeling roller 14 by a biasing member such as a spring or the like, with the backing paper 4 sandwiched therebetween. The peeling roller 14 rotates in a clockwise direction in FIG. 1, and conveys the backing paper 4 turned back by a peeling guide 19 to be described later toward the winding roller 16.

In addition, the label conveying part 10 includes two rollers 17 that support the label paper 2 between the delivery roller 11 and the capstan roller 12, and one roller 18 that supports the backing paper 4 between the peeling roller 14 and the winding roller 16. These rollers 17 and 18 are driven to rotate by the conveyed label paper 2.

Each of the plurality of rollers 11 to 18 of the label conveying part 10 has a rotation shaft (not illustrated) extending in a direction perpendicular to the paper surface in FIG. 1. The frame of the printer 100 rotatably supports both ends of the rotation shafts of the plurality of rollers 11 to 18. The frame of the printer 100 supports a conveying motor 64. The capstan roller 12, the pinch roller 13, the peeling roller 14, the pinch roller 15, and the conveying motor 64 (FIG. 2), which will be described later, are examples of a conveying part described in the claims of the present application.

The label conveying part 10 conveys the label paper 2 through the conveyance path 1 in cooperation with a platen roller 34 of the printing unit 30 to be described later. The conveyance path 1 passes between a thermal head 32, which will be described later, and the platen roller 34 of the printing unit 30. The platen roller 34 of the printing unit 30 can apply a conveying force to the label paper 2. The label conveying part 10 conveys the label paper 2 in a posture in which the surface of the backing paper 4 to which the label 3 is attached faces the thermal head 32 of the printing unit 30.

At a position spaced apart from the platen roller 34 of the printing unit 30 on a right side as illustrated in FIG. 1, the label conveying part 10 includes the peeling guide 19 for peeling the label 3 from the backing paper 4. The peeling guide 19 is in sliding contact with a surface of the label paper 2 pulled out by the capstan roller 12, the surface being opposite to the label attaching surface, and turns the label paper 2 by about 180° in an inverse direction (left direction in FIG. 1). The peeling guide 19 peels off (e.g., removes, separates, etc.) the label 3 from the backing paper 4 by the waist or portion of the label 3 that is not bent together with the backing paper 4. In the vicinity of the peeling guide 19, there is a label processing device (not illustrated) that receives and processes the label 3 peeled from the backing paper 4.

The printer 100 includes a sensor 40 that detects a gap between two adjacent labels 3 along the backing paper 4 of the label paper 2 conveyed by the label conveying part 10. The sensor 40 is, for example, a transmission sensor having a light emitting part and a light receiving part that are arranged with the conveyance path 1 interposed therebetween. The sensor 40 is located at a position where light incident on the light receiving part from the light emitting part crosses the conveyance path 1 between the capstan roller 12 and the printing unit 30. The sensor 40 measures an intensity of the light transmitting through the label paper 2 conveyed through the conveyance path 1, and detects a peak of the intensity as a center (center of the gap) of a portion of only the backing paper 4 between two consecutive labels 3.

The ribbon conveying part 20 includes a delivery roller 21 around which the long belt-like ink ribbon 22 is wound into rolls, and a winding roller 23 that winds the used ink ribbon 22 having passed through the printing unit 30 into rolls. The ink ribbon 22 between the delivery roller 21 and the winding roller 23 passes between the thermal head 32 and the platen roller 34 so as to sequentially overlap a plurality of labels 3 of the label paper 2 conveyed through the printing unit 30 along the conveyance path 1. The label paper 2 and the ink ribbon 22 are conveyed in the same direction at the same conveyance speed to pass through the printing unit 30. In addition, the ribbon conveying part 20 includes two rollers 24 that support the ink ribbon 22, and a conveying roller 25 that applies a conveying force to the ink ribbon 22.

Each of the plurality of rollers 21, 23, 24, and 25 of the ribbon conveying part 20 has a rotation shaft extending in the direction perpendicular to the paper surface in FIG. 1. The frame of the printer 100 rotatably supports both ends of the rotation shafts of the plurality of rollers 21, 23, 24, and 25. The ribbon conveying part 20 includes a torque limiter between the delivery roller 21, the winding roller 23, the conveying roller 25, and a ribbon motor 65 (FIG. 2) to be described later. The frame of the printer 100 supports the ribbon motor 65.

The printing unit 30 includes the thermal head 32 and the platen roller 34. The printing unit 30 is provided with the thermal head 32 on a back surface side of the ink ribbon 22, that is, at a position where the label paper 2 and the ink ribbon 22 are sandwiched between the thermal head 32 and the platen roller 34. The platen roller 34 is located at a position where the platen roller 34 faces the thermal head 32 with the label paper 2 and the ink ribbon 22 in an overlapped state interposed therebetween. The thermal head 32 is an example of a print head described in the present application.

The thermal head 32 includes a plurality of heat generating elements arranged in the direction perpendicular to the paper surface in FIG. 1. In a state in which the thermal head 32 is moved to a printing position the plurality of heat generating elements of the thermal head 32 are brought into contact with a back surface of the ink ribbon 22, and the thermal head 32 and the platen roller 34 pinch the ink ribbon 22 and the label paper 2 therebetween. The platen roller 34 rotates while pinching the label paper 2 between the platen roller 34 and the thermal head 32, thereby applying a conveying force to the label paper 2. The printing unit 30 presses the ink ribbon 22 against the label paper 2 by the thermal head 32, heats the ink ribbon 22 by the plurality of heat generating elements, and performs printing (e.g., transfer thermal printing) in a printed area of the label 3 of the label paper 2.

Figure 2:
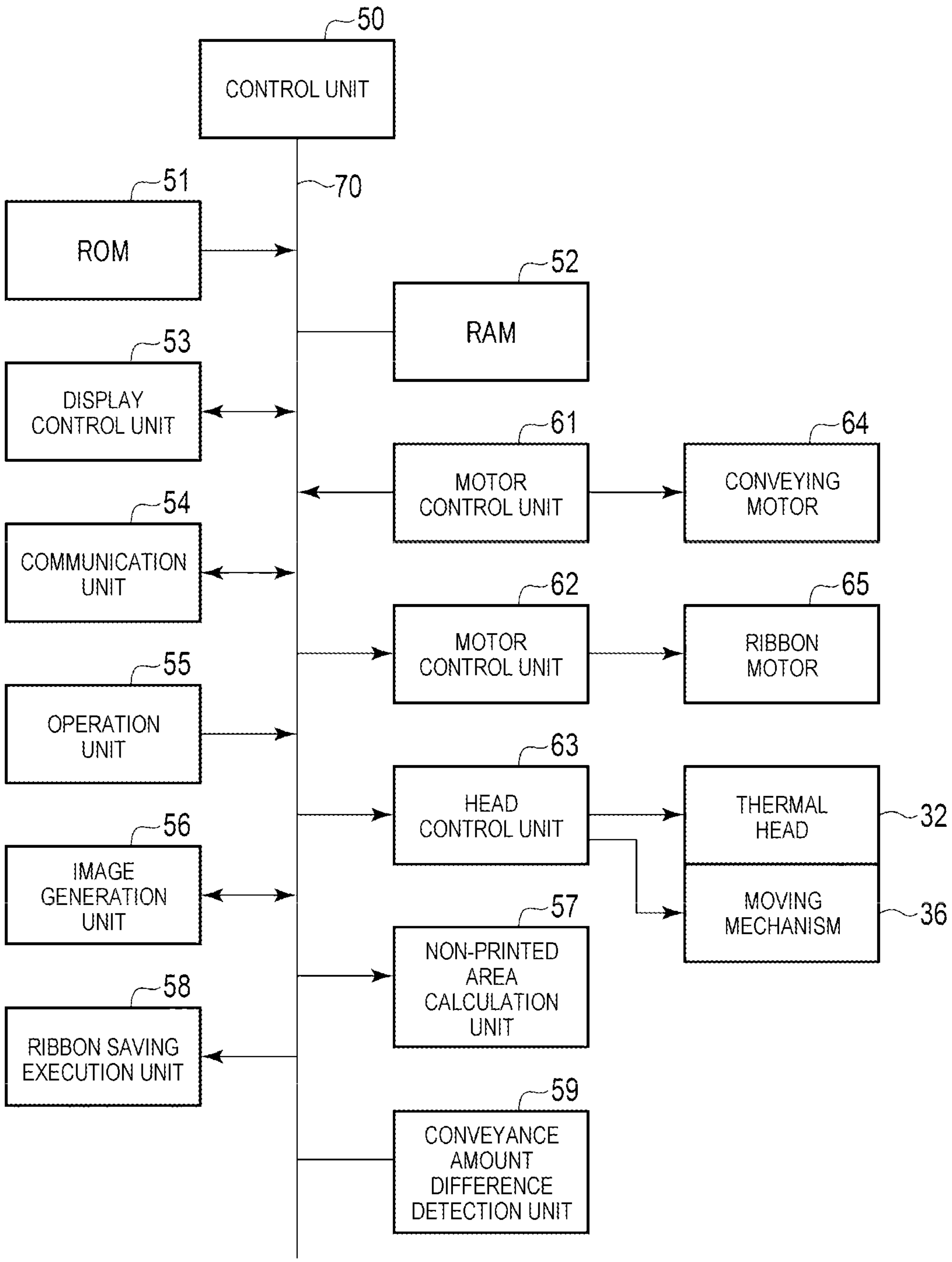
FIG. 2 is a block diagram illustrating a control system.

As illustrated in FIGS. 1 and 2, the printer 100 includes a moving mechanism 36 (e.g., an actuator, an actuator assembly, a head carrier, etc.). The moving mechanism 36 moves the thermal head 32 between the printing position where the thermal head 32 is pressed (e.g., forced) against the platen roller 34 and a non-printing position where the thermal head 32 is separated from the ink ribbon 22. When the thermal head 32 is moved to the non-printing position, the thermal head 32 is separated from the ink ribbon 22, and the force of pinching the label paper 2 and the ink ribbon 22 between the thermal head 32 and the platen roller 34 also disappears. Therefore, in a state where the thermal head 32 is moved to the non-printing position, the conveying force applied from the platen roller 34 to the label paper 2 is reduced or substantially disappears. For example, when the thermal head 32 is moved to the non-printing position slipping may occur between the platen roller 34 and the label paper 2 due to a reduction in the pinching force that would otherwise contribute to friction between the label paper 2 and the platen roller 34.

In some embodiments, the moving mechanism 36 may move the platen roller 34 instead of or in conjunction with moving the thermal head 32. In this case, the moving mechanism 36 moves the platen roller 34 between a printing position where the platen roller 34 is pressed toward the thermal head 32 and a non-printing position where the platen roller 34 is separated (e.g., spaced, gapped, etc.) from the thermal head 32.

As illustrated in FIG. 2, the printer 100 includes a control unit 50 (e.g., controller, processor or processing circuit, control circuit, etc.), a read-only memory (ROM) 51, a random access memory (RAM) 52, a display control unit 53, a communication unit 54, an operation unit 55 (e.g., user interface, operator interface, input/output device, etc.), an image generation unit 56, a non-printed area calculation unit 57, a ribbon saving execution unit 58, a conveyance amount difference detection unit 59, a motor control unit 61, a motor control unit 62, a head control unit 63, the conveying motor 64, the ribbon motor 65, the thermal head 32, and the moving mechanism 36. A bus line 70 communicably connects the control unit 50, the ROM 51, the RAM 52, the display control unit 53, the communication unit 54, the operation unit 55, the image generation unit 56, the non-printed area calculation unit 57, the ribbon saving execution unit 58, the conveyance amount difference detection unit 59, the motor control unit 61, the motor control unit 62, and the head control unit 63.

The control unit 50 includes a central processing unit (CPU) that controls an operation of the printer 100. The control unit 50 is an example of a control unit described in the present application, and also functions as an adjustment unit and a second control unit (e.g., controller, processor or processing circuit, control circuit, etc.). The ROM 51 stores operation information, setting information (e.g., setpoint values, control variable values, etc.), an operation program, and the like. The RAM 52 stores various types of processing information such as the number of drive steps of the conveying motor 64. The display control unit 53 controls a display unit on a control panel (not illustrated) of the printer 100. The communication unit 54 communicates with a host computer or the like provided externally. The operation unit 55 is, for example, on a control panel, and includes various input keys and the like for an operator to manually input data. The operator can input, for example, the number of drive steps of the conveying motor 64 in the ribbon saving via the operation unit 55.

The image generation unit 56 renders, in a buffer, print data to be printed on the label 3 such as a two-dimensional barcode or a character (e.g., a barcode with number characters near it). The communication unit 54 acquires, for example, information on the print data as a print command from a host computer or the like. The non-printed area calculation unit 57 and the ribbon saving execution unit 58 specify the non-printed area of the label paper 2 for ribbon saving. The non-printed area calculation unit 57 calculates a dimension of the non-printed area along the conveyance direction, based on the print data rendered in the buffer by the image generation unit 56 and a dimension of a gap between adjacent labels 3 input in advance, for example, by the operator via the operation unit 55. For example, the non-printed dimension of the label may be, for example, the trailing 3 centimeters of a 4 centimeter label (where the leading centimeter of the label is a printed area), added to the gap between the trailing edge of the label and the leading edge of a subsequent label of the label paper 2. The dimension of the gap can also be acquired via the sensor 40, for example.

The conveyance amount difference detection unit 59 detects a difference between a first conveyance amount (e.g., conveyance distance, conveyance energy, etc.) that occurs when the label 3 passes through the thermal head 32 in a ribbon saving mode and a second conveyance amount that occurs when the label 3 passes through the thermal head 32 in a state where the thermal head 32 is disposed and held at the printing position (without ribbon saving). For example, 4.9 centimeters of label paper may be the first conveyance amount, and 5 centimeters may be the second conveyance amount. In this example, the difference detection unit 59 may detect a 0.1 centimeter difference. The conveyance amount difference detection unit 59 is an example of a detection unit described in the present application. The ribbon saving mode is an example of a saving mode described in the present application.

The motor control unit 61 controls the conveying motor 64. The conveying motor 64 rotationally drives the capstan roller 12 and the peeling roller 14 of the label conveying part 10, and the platen roller 34. The conveying motor 64 is a stepping motor. The conveying motor 64 applies a driving force to rotation shafts of the three rollers 12, 14, and 34 via a belt or a pulley (not illustrated). That is, the conveying motor 64 synchronously rotates the three rollers 12, 14, and 34. In addition, the motor control unit 62 controls the ribbon motor 65 that rotationally drives the delivery roller 21, the winding roller 23, and the conveying roller 25.

The head control unit 63 controls the moving mechanism 36 to move the thermal head 32 between the printing position and the non-printing position. In addition, the head control unit 63 controls a heat generation state of the heat generating elements of the thermal head 32.

Here, ribbon saving will be described.

Ribbon saving (e.g., the ribbon saving mode) is intended to reduce the amount of consumption (e.g., consumption rate, rate of consumption, etc.) of the ink ribbon 22 by stopping the conveyance of the ink ribbon 22 in the non-printed area where printing on the label paper 2 is not required. That is, when the non-printed area passes through the thermal head 32, only the label paper 2 is conveyed and not the ink ribbon 22. As described herein, the non-printed area is the gap between the labels 3 of the label paper 2 or an area of the label paper 2 in which no character or image is printed, and is an area that differs depending on the print data. Accordingly, a stream of ribbon is not utilized for thermal transfer printing during the passing of the non-printed areas through the thermal head 32, and as such, lengths of ribbon that pass through the thermal head during the passing of the non-printed areas is effectively wasted.

For example, when performing the ribbon saving with respect to the non-printed area of the label paper 2, when the non-printed area of the label paper 2 reaches the thermal head 32, the head control unit 63 controls the moving mechanism 36 to retract the thermal head 32 to the non-printing position. Accordingly, the thermal head 32 is separated from the ink ribbon 22. At this time, the motor control unit 62 stops the ribbon motor 65 to stop the conveyance of the ink ribbon 22. The label conveying part 10 continuously conveys only the label paper 2 until the non-printed area completely passes through the thermal head 32. At this time, the conveying force applied from the platen roller 34 to the label paper 2 is substantially zero (e.g., the thermal head 32 and platen roller 34 are not forced to pinch the label paper 2 and ribbon 22 together).

When a printed area adjacent to the non-printed area reaches (or almost reaches) the thermal head 32 by the conveyance of the label paper 2, the head control unit 63 controls the moving mechanism 36 to move the thermal head 32 to the printing position. At this time, the motor control unit 62 drives the ribbon motor 65 in accordance with the movement of the thermal head 32 to resume the conveyance of the ink ribbon 22. In this state, the platen roller 34 applies a conveying force to the label paper 2. The thermal head 32 causes the plurality of heat generating elements to generate heat and performs printing in the printed area of the label paper 2. In the ribbon saving, the thermal head 32 is moved between the non-printing position and the printing position with respect to the non-printed area and the printed area adjacent to each other in the conveyance direction of the label paper 2, and accordingly the ink ribbon 22 is repeatedly stopped and moved (e.g., conveyance is repeatedly paused and resumed).

Based on the dimension of the non-printed area calculated by the non-printed area calculation unit 57, the ribbon saving execution unit 58 determines whether to perform the above-described ribbon saving. When it is determined that the dimension of the non-printed area is equal to or larger than a preset threshold S1 [mm] (e.g., 10 millimeter, 2 inches, etc.), the ribbon saving execution unit 58 performs the ribbon saving. On the other hand, when the dimension of the non-printed area is smaller than the threshold S1, the ribbon saving execution unit 58 does not perform the ribbon saving. For example, the preset threshold (e.g., 1 inch at a feed rate of 10 inches per second) may correspond to a duration of time needed for starting and/or stopping conveyance of the ribbon 22, and/or a capacity of the moving mechanism 36 to transition the thermal head 32 between the printing position and the nonprinting position.

The threshold S1 can be set to be equal to or larger than a length by which the label paper 2 is conveyed within the time required for the thermal head 32 to complete one reciprocation of moving from the printing position to the non-printing position and immediately returning to the printing position. For example, when the time required for one reciprocation of the thermal head 32 is a fixed value, this length is a value that depends on a printing speed (the conveyance speed or feed rate of the label paper 2). That is, at a higher printing speed, a larger length of label paper 2 is conveyed within a unit of time, and a accordingly, a larger length quantity would correspond to the time attributed to one reciprocation of the thermal head 32). The threshold S1 may be set automatically (e.g., by the control unit 50) or may be set by the operator via the operation unit 55. The threshold S1 may be equal to or larger than the length by which the label paper 2 is conveyed within the time required for one reciprocation of the thermal head 32.

Based on the print data rendered in the buffer by the image generation unit 56, a dimension of the label 3, and the dimension of the gap (e.g., a gap value input in advance by an operator via the operation unit 55, a gap value determined by sensor(s), a static gap value, etc.), the non-printed area calculation unit 57 calculates a dimension of the non-printed area along the conveyance direction of the label paper 2. The non-printed area calculation unit 57 calculates dimensions of all the non-printed areas within the length of the label 3 along the conveyance direction, and calculates a dimension of the non-printed area including the gap between two labels 3 adjacent to each other in the conveyance direction. In the latter case, the non-printed area calculation unit 57 takes, as one non-printed area, an area obtained by adding a non-printed area located at a trailing end in the conveyance direction of the label 3 located in front of the gap, a non-printed area located at a leading end in the conveyance direction of the label 3 located behind the gap, and the gap, and calculates a dimension of the one non-printed area. The ribbon saving execution unit 58 specifies a non-printed area satisfying a ribbon saving condition according to a result obtained by the calculation of the non-printed area calculation unit 57.

When the ribbon saving is performed as in the present embodiment, the thermal head 32 is moved to the non-printing position during a period in which the non-printed area having a dimension exceeding the threshold S1 is passing through the thermal head 32. During a period in which the thermal head 32 is moving to the non-printing position, the conveying force applied from the platen roller 34 to the label paper 2 substantially disappears. That is, when the ribbon saving is performed, a conveying force acting on the label paper 2 may include only a conveying force applied from the capstan roller 12 and a conveying force applied from the peeling roller 14. As described, when the conveying force acting on the label paper 2 is reduced due to the variation in pinching force attributed to the ribbon saving, an actual conveying distance of the label paper 2 may be reduced as compared with a case where the ribbon saving is not performed (a state where the thermal head 32 is disposed and held at the printing position).

For example, if the label paper 2 is conveyed in a state in which the ribbon saving is not performed, the number of drive steps of the conveying motor 64 during a period from when a leading end of one label 3 in the conveyance direction reaches the thermal head 32 to when a trailing end of the label 3 in the conveyance direction passes through the thermal head 32 is 100 steps, and if the label paper 2 is conveyed in a state in which the ribbon saving is performed, the number of drive steps of the conveying motor 64 required for one label 3 to pass through the thermal head 32 is 105 steps. In this case, a conveyance delay corresponding to 5 steps is caused by the ribbon saving (e.g., slipping on the platen roller). When the conveyance delay occurs in the label paper 2, there is a possibility that the printing position is shifted with respect to the label 3 (e.g., shifting effectuating printing in some or all of the non-printed areas such as the gap).

In the present embodiment, advantageously, a conveyance amount (e.g., a conveyance length) of the label paper 2 is adjusted in the case where the ribbon saving is performed. In the present embodiment, for example, the printing on each label 3 of the label paper 2 is started when the number of drive steps of the conveying motor 64 reaches a predetermined number of steps. The number of drive steps may be counted based on sensor 40 detecting the label 3. Therefore, the conveyance amount of the label paper 2 based on the conveying motor 64 is adjusted by changing the number of drive steps of the conveying motor 64.

Hereinafter, a method for adjusting the conveyance amount of the label paper 2 in the case of performing the ribbon saving will be described with reference to the flowcharts in FIGS. 3 to 5.

Figure 3:
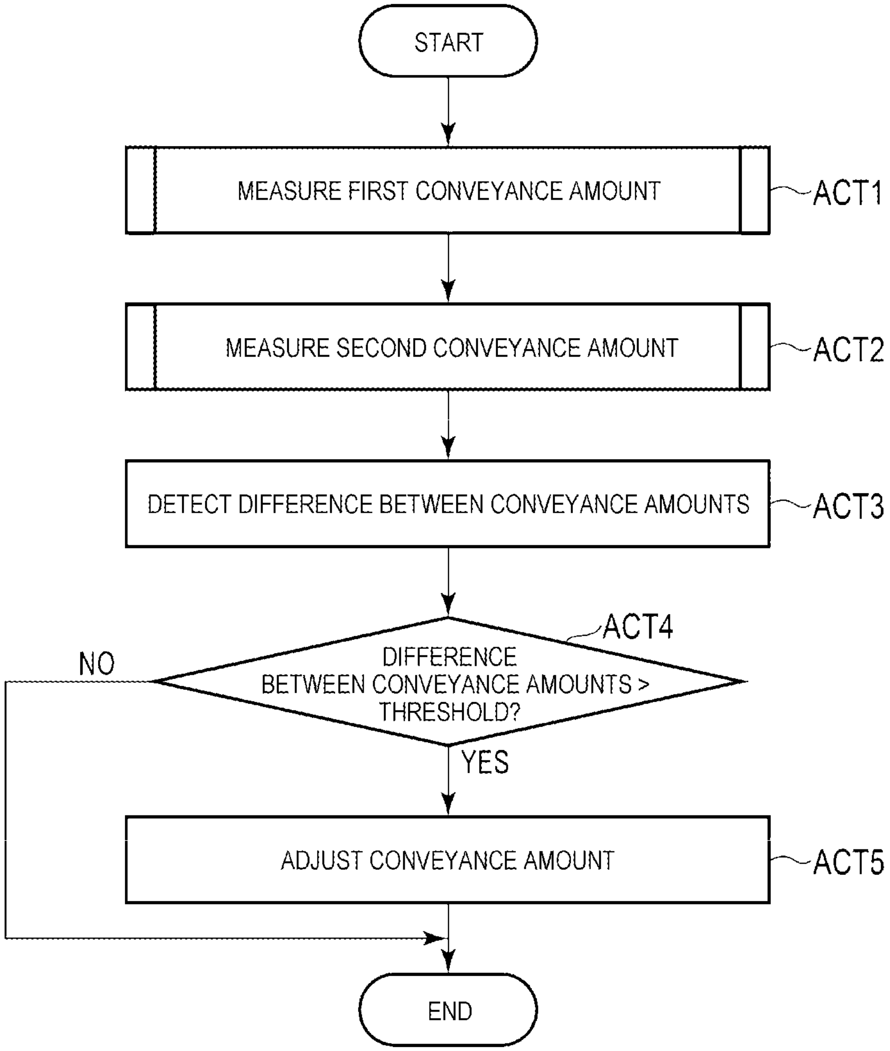
FIG. 3 is a flowchart illustrating a method for adjusting a conveyance amount.

First, as ACT 1 in FIG. 3, the control unit 50 of the printer 100 measures a first conveyance amount required for the label 3 to pass through the thermal head when the ribbon saving is performed. A processing flow of ACT 1 is illustrated in FIG. 4.

Figure 4:
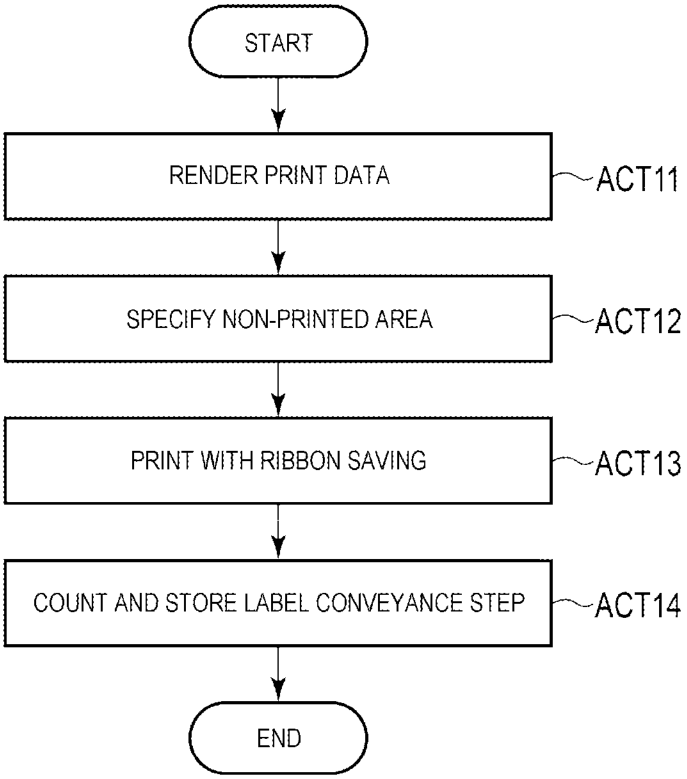
FIG. 4 is a flowchart illustrating a processing flow of ACT 1 in FIG. 3.

In ACT 11 in FIG. 4, the control unit 50 controls the image generation unit 56 to render, in a buffer, print data acquired from a host computer or the like. Next, as ACT 12, the control unit 50 controls the non-printed area calculation unit 57 and the ribbon saving execution unit 58 to specify a non-printed area of the label paper 2. Then, as ACT 13, the control unit 50 performs the above-described ribbon saving and performs printing on the label 3 of the label paper 2.

Thereafter, as ACT 14, the control unit 50 counts the number of drive steps (e.g., stepper motor steps, pulses in an AC cycle, rotor rotations, magneto-resistive signals, hall effect signals, inductive signals, etc.) of the conveying motor 64 required for the label 3 to pass through the thermal head 32 in ACT 13, and stores the number of drive steps as the first conveyance amount in the RAM 52. For example, the control unit 50 counts the number of drive steps of the conveying motor 64 from when a leading end of the label 3 in the conveyance direction passes through the sensor 40 to when a trailing end thereof passes through the sensor 40 in the state where the ribbon saving is performed, and sets the number of drive steps as the first conveyance amount.

Next, as ACT 2 in FIG. 3, the control unit 50 measures a second conveyance amount required for the label 3 to pass through the thermal head 32 without the ribbon saving. A processing flow of ACT 2 is illustrated in FIG. 5.

Figure 5:
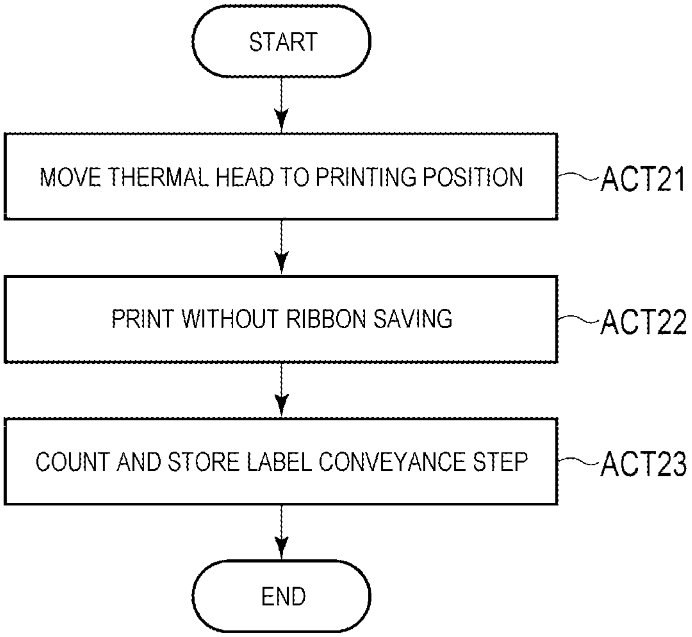
FIG. 5 is a flowchart illustrating a processing flow of ACT 2 in FIG. 3.

As ACT 21 in FIG. 5, the control unit 50 controls the moving mechanism 36 to move the thermal head 32 to the printing position. In this state, as ACT 22, the control unit 50 actually operates the printer 100 without performing the ribbon saving (in a state in which the thermal head 32 is moved to the printing position), and prints the data rendered in ACT 11 on the label 3 of the label paper 2, for example.

Thereafter, as ACT 23, the control unit 50 counts the number of drive steps of the conveying motor 64 required for the label 3 to pass through the thermal head 32 in ACT 22, and stores the number of drive steps as the second conveyance amount in the RAM 52. For example, the control unit 50 counts the number of drive steps of the conveying motor 64 from when a leading end of the label 3 in the conveyance direction passes through the sensor 40 to when a trailing end thereof passes through the sensor 40 in the state where the ribbon saving is not performed, and sets the number of drive steps as the second conveyance amount.

Next, as ACT 3 in FIG. 3, the control unit 50 controls the conveyance amount difference detection unit 59 to detect a difference between the first conveyance amount and the second conveyance amount. At this time, the conveyance amount difference detection unit 59 reads the first conveyance amount and the second conveyance amount from the RAM 52, and detects the difference between these conveyance amounts. Then, as ACT 4, the conveyance amount difference detection unit 59 compares the conveyance amount difference detected in ACT 3 with a preset threshold S2 [step]. When it is determined in ACT 4 that the conveyance amount difference exceeds the threshold S2, the control unit 50 proceeds to ACT 5 and adjusts the conveyance amount (the number of drive steps of the conveying motor 64) of the label paper 2 in the case where the ribbon saving is performed so that the conveyance amount difference is zero.

For example, when the printer 100 is operated without the ribbon saving, the number of drive steps of the conveying motor 64 required for the label 3 of the label paper 2 to pass through the thermal head 32 is 100 steps, and when the ribbon saving is performed, the number of drive steps required for the label 3 to pass through the thermal head 32 is 105 steps. In this case, based on a fact that the conveyance amount difference exceeds the threshold S2 (e.g., 3 [step], 3 motor steps, etc.), the control unit 50 adjusts the conveyance amount of the label paper 2 so as to add 5 steps to the number of drive steps of the conveying motor 64 in the case where the ribbon saving is performed. Then, the control unit 50 stores the adjusted conveyance amount obtained by adding 5 steps in the RAM 52 as the conveyance amount of the label paper 2 in the case of performing the ribbon saving.

In the case of performing the ribbon saving, the printer 100 conveys the label paper 2 by the adjusted conveyance amount stored in the RAM 52. Accordingly, in the case of performing the ribbon saving, even if the thermal head 32 is separated from the platen roller 34 and the conveying force applied to the label paper 2 decreases, it is possible to prevent a conveyance delay from occurring in the label paper 2, and it is possible to prevent a shift in the printing position.

In the above-described embodiment, the method for adjusting the conveyance amount by focusing on one label 3 has been described. Alternatively, for example, when the conveyance amount difference is small, the conveyance amount in the case of performing the ribbon saving may be adjusted by focusing on a plurality of consecutive labels 3 of the label paper 2.

For example, when the difference between the first conveyance amount in the case where the label 3 passes through the thermal head 32 with the ribbon saving performed and the second conveyance amount in the case where the label 3 passes through the thermal head 32 with the ribbon saving not performed is smaller than the threshold S2, the control unit 50 may sum up the above-described conveyance amount differences with respect to the plurality of consecutive labels 3 and compare the sum with the threshold S2. For example, the cumulative conveyance amount difference with respect to a plurality of labels 3 may be compared to the cumulative sum of the threshold S2 corresponding to the plurality of labels 3. In this case, the control unit 50 may divide the sum by the number of labels 3 at which the sum exceeds the threshold S2 to obtain a value (a conveyance delay with respect to one label 3), and adjust the conveyance amount of the label paper 2 in the case of performing the ribbon saving so that this value becomes zero. For example, the cumulative difference may be divided by the number of labels to yield an average difference for each label in the group, and the average difference may be used (e.g., to adjust a setting corresponding to the conveyance amount, such as a motor step setpoint value) to eliminate the average difference between the corresponding averaged threshold value (threshold value S1).

When the conveyance amount of the label paper 2 is changed depending on whether the ribbon saving is performed as in the present embodiment, the conveyance speed of the label paper 2 in the case of performing the ribbon saving may be slightly smaller than the conveyance speed of the label paper 2 in the case of not performing the ribbon saving. Therefore, when the control of the present embodiment described above is performed, if the conveyance speed of the ink ribbon 22 is constant, a conveyance shift occurs between the label paper 2 and the ink ribbon 22. However, in the printer 100 of the present embodiment, since the ink ribbon 22 is pinched together with the label paper 2 between the thermal head 32 and the platen roller 34, a change in the conveyance amount of the label paper 2 accompanying the movement of the thermal head 32 also affects the ink ribbon 22 in the same manner. Therefore, even if the conveyance amount of the label paper 2 is changed depending on whether the ribbon saving is performed as in the present embodiment, control of changing a conveyance amount (e.g., conveyance rate) of the ink ribbon 22 accordingly is unnecessary.

The label paper 2 used in the printer 100 of the present embodiment may have a specification in which, for example, pitches of the labels 3 along the conveyance direction are ±3% or less with respect to a predetermined reference value K1 [mm]. In other words, it is sufficient that conveyance pitches of the labels 3 of the label paper 2 fall within a range of ±3% with respect to the reference value K1. For this reason, if conveyance pitches of a plurality of consecutive labels 3 shift to a plus side or a minus side with respect to the reference value K1, when the label paper 2 is conveyed based on the reference value K1, there is a possibility that the printing position is shifted with respect to the label 3.

Therefore, in the present embodiment, the conveyance pitches of the labels 3 are detected via the sensor 40, and shifts of the conveyance pitches from the reference value K1 are summed up. The conveyance amount of the label paper 2 is adjusted at a time point when the sum exceeds another reference value K2 [mm] set in advance. This control can be performed in addition to the control executed in the case of performing the ribbon saving described above, or can be performed separately from the control executed in the case of performing the ribbon saving described above.

For example, shifts of conveyance pitches of 10 consecutive labels 3 from the reference value K1 are summed up, and at a time point when the sum exceeds the reference value K2, the control unit 50 of the printer 100 controls the conveying motor 64 so that the sum of the shifts of the 10 labels is zero, and adjusts the conveyance amount of the label paper 2 by using the capstan roller 12 and the peeling roller 14 of the label conveying part 10 and the platen roller 34. Accordingly, it is possible to correct the shift of the conveyance pitch, and it is possible to prevent a shift in the printing position.

Although the printer 100 using the ink ribbon 22 has been described in the above-described embodiment, the ink ribbon 22 is not an essential component. For example, the present embodiment can be applied to a printer. In the printer, thermal paper is used instead of the label paper 2, the thermal head 32 is pressed against a printed area to perform printing, and the thermal head 32 is retracted to a non-printing position when a non-printed area passes through the thermal head 32.

Further, in the above-described embodiment, the case where the conveyance amount is adjusted by detecting conveyance amounts of a plurality of labels 3 has been described, and in a case where a dimension of the label paper 2 (a dimension of the non-printed area, a label length, a gap length, and the like) are known in advance, an operator can set and input the conveyance amount in the case of performing the ribbon saving via the operation unit 55.

While certain embodiment have been described, this embodiment has been presented by way of example only, and is not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A printer comprising:

a conveyor configured to convey a medium to be printed along a conveyance path;

a print head configured to print in a first area of the medium;

a platen roller disposed on a side opposite to the print head, wherein the conveyance path is interposed between the platen roller and the side opposite to the print head, the platen roller configured to apply a conveying force to the medium by rotating while pinching the medium between the platen roller and the print head;

an actuator configured to move one of the print head and the platen roller between (i) a first position where the print head and the platen roller pinch the medium and (ii) a second position wherein the print head is spaced from the medium;

one or more processors operatively coupled to the actuator and configured to:

operate the actuator in a saving mode wherein the one of the print head and the platen roller is moved to the first position when the first area of the medium to be printed passes through the print head, and the one of the print head and the platen roller is moved to the second position when a second area of the medium passes through the print head;

detect a difference between:

a first conveyance amount for the medium to pass through the print head when both (i) the medium is conveyed by the conveyor and (ii) the actuator is operated in the saving mode; and a second conveyance amount for the medium to pass through the print head when both (i) the medium is conveyed by the conveyor and (ii) the one of the print head and the platen roller is in the first position; and adjust, based on the difference, a setting corresponding to the first conveyance amount to eliminate the difference between the first conveyance amount and the second conveyance amount.

2. The printer of claim 1, further comprising:

an ink ribbon conveyed in a same direction as the medium conveyed along the conveyance path and through the print head.

3. The printer of claim 2, wherein the one or more processors is configured to stop conveyance of the ink ribbon when the second area of the medium to be printed passes through the print head.

4. The printer of claim 1, wherein the one or more processors is configured to adjust the setting corresponding to the first conveyance amount when the difference between the first conveyance amount and the second conveyance amount exceeds a threshold value.

5. The printer of claim 1, wherein the one or more processors is configured to receive user input regarding the setting corresponding to the first conveyance amount.

6. The printer of claim 1, wherein the medium is a long belt-like medium having a plurality of media to be printed arranged on the belt-like medium, and the conveyor conveys the long belt-like medium along the conveyance path.

7. The printer of claim 6, further comprising:

a sensor configured to detect a conveyance pitch of a plurality of the media; and a second one or more processors operatively coupled to the conveyor and configured to operate the conveyor and the platen roller such that when a cumulative difference between a detected conveyance pitch and a reference value exceeds a preset threshold, the cumulative difference is zero.

8. The printer of claim 6, wherein the difference is an cumulative difference with respect to the plurality of media to be printed, and wherein the one or more processors is configured to adjust the setting corresponding to the first conveyance amount based on a determination that the cumulative difference exceeds a threshold value.

9. The printer of claim 8, further comprising:

a sensor configured to detect conveyance pitches of the plurality of media; and a second one or more processors configured to drive and control the conveyor such that when a sum of the difference between conveyance pitches and a reference value detected by the sensor exceeds a preset threshold, the sum is zero.

10. The printer of claim 8, further comprising:

a user interface configured to receive a input from a user regarding at least one of the first conveyance amount or the second conveyance amount.

* * * * *